MAGNETIC TAPE RECORDER

Filed June 19, 1951

Inventors.
Hans-Christoph Wohlrab, &
Werner Jahn.
By. [signature] Atty.

United States Patent Office 2,735,900

Patented Feb. 21, 1956

2,735,900

MAGNETIC TAPE RECORDER

Hans-Christoph Wohlrab and Werner Jahn, Emmendingen (Baden), Germany, assignors to Klangfilm Gesellschaft mit beschränkter Haftung, Berlin and Karlsruhe, Germany, a German corporation Application June 19, 1951, Serial No. 232,367

Claims priority, application Germany October 1, 1948

8 Claims. (Cl. 179—100.2)

This invention relates to magnetic tape recorders and the like, and is particularly concerned with a device for carrying the magnetic heads and for controlling the movement of the tape or film relative thereto.

It is known to use in magnetic tape recorders three transducers or heads serving for the recording, for reproduction and for cancellation, respectively. In prior structures these heads are arranged serially apart from the capstan drum for the magnetic tape.

An arrangement as indicated in the foregoing paragraph has the disadvantage that the tape under certain conditions does not move sufficiently quietly at the sound control point.

In order to obviate this drawback, the invention proposes to arrange at least the record or the reproduce head, or both, serially as viewed in the direction of the motion of the tape, inside of the capstan drum which is preferably provided with a balancing or stabilizing mass, e. g., a flywheel. If desired, the erase head may also be disposed within such drum.

The positional adjustment of the heads is suitably so that they engage the tape with a slight pressure, resulting in the particular advantage that the resiliency of the tape can be utilized.

The tape may, however, be so arranged that it moves over the heads, engaging them with a fine touch, in which case it is suitable to press the tape resiliently against the heads.

In accordance with another object of the invention, double or multiple heads serving for the recording or reproduction of double- or multi-sound tracks may be arranged within the capstan drum.

Figures 1, 2:
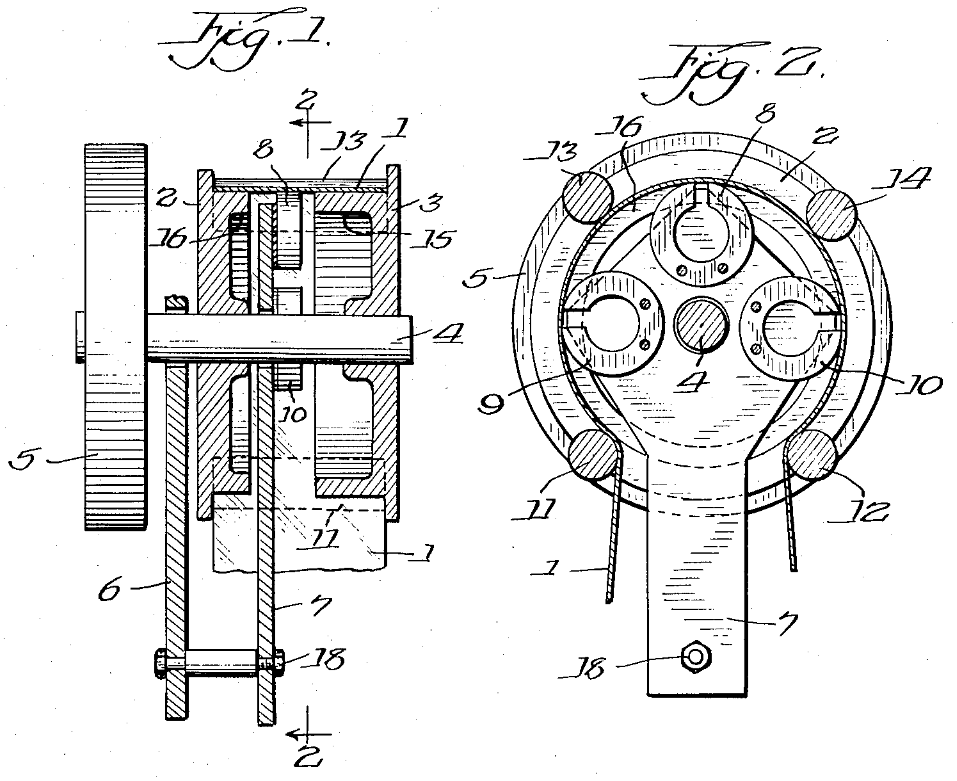
Figure 3:
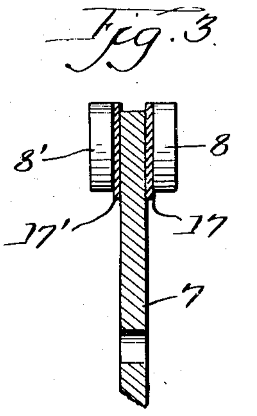

The objects noted above and other objects and features will presently be explained in detail with reference to the accompanying drawings in which Fig. 1 shows an embodiment of the invention with some parts indicated in diagrammatic sectional view;

Fig. 2 is a transverse section through the device shown in Fig. 1, showing the magnetic heads in elevational view; and Fig. 3 indicates in diagrammatic manner a modification in which the magnetic heads are disposed coaxially.

Referring now to the drawings: the magnetic tape 1 is guided at least along its margins upon disklike drum elements 2 and 3 forming the capstan drum, the tape embracing these elements peripherally over as great an area as possible. The drum elements are mounted upon a shaft 4 provided with a flywheel 5. The frontally positioned drum element 3 may be rotatably disposed on the shaft 4. The shaft 4 is journalled in a suitable structural member 6.

The drum elements 2 and 3 are axially spaced in accordance with the width of the tape and provide an interior space for accommodating the magnetic heads 8, 9, 10. The latter are secured to a holder 7 which may in turn be fastened to the member 6 by means of a suitable stud 18. It may be desirable under certain conditions to provide for an accurate bearing for this holder upon the shaft 4. The head 10 may be the record head. The required coaction of the tape 1 with the record head is secured by guide rollers 11 and 12. The magnetic heads may be of customary structure, but need not necessarily be of ring-shaped configuration as shown in the drawings.

The magnetic heads are arranged on the holder 7 in such a manner relative to the tape 1 that they exert a slight pressure thereon, the resiliency of the tape aiding in this function. Suitable pressure rollers 13, 14 may be provided to secure the position of the tape upon the drum elements 2 and 3.

The magnetic heads are arranged in serial relationship, as seen in the direction of motion of the tape, so that their air gaps are disposed perpendicular thereto.

The drum elements 2 and 3 are for magnetic shielding preferably made of suitable material, for example, iron. The cylindrical portions 15, 16 of these drum elements extend axially inwardly close to the magnetic heads and to the holder 7, respectively.

Three heads are shown disposed within the drum structure, but it will be understood that one head may suffice serving as record and as reproduce head. A separate erase head may be provided in addition thereto. The latter is, however, not critical so far as the motion or transport conditions of the tape are concerned, and if desired may be disposed on the outside.

In the illustrated embodiment, the heads are arranged relative to the shaft 4 radially on the outside thereof. It is, however, possible with ring-shaped configuration of the heads to provide for one or more coaxially disposed heads which embrace the shaft 4. Such an arrangement will save space.

It is of advantage in using perforated tape or film to guide the tape in front and in back of the capstan drum over the same sprocket (not shown) and to employ tension rollers and the like which acts upon the tape in the manner of a filter.

Fig. 3 shows diagrammatically an arrangement comprising a plurality of coaxially disposed heads 8 and 8′. On one side of the holder 7 is disposed the record head 8 and on the other side an additional record head 8′. Numeral 17 indicates shielding means made, for example, of brass. Such an arrangement is suitable, for example, for the purpose of producing two sound tracks or to scan two sound tracks or lanes, as in stereophonic practice. More heads may be disposed alongside in axial direction, depending on the width of the tape and the number of tracks or lanes to be recorded or scanned. The use of a plurality of heads is also analogously possible in the case of the reproduce and erase heads.

The holder 7 may serve as a journal for the shaft 4, and in such a case the bearing for the shaft in the structural member 6 is not necessary.

The adjustment of the magnetic heads relative to the tape or film may also be carried out so that they contact the tape with a fine touch. It is suitable in such a case to press the tape or film yieldably against the magnetic heads, that is, against the air gaps thereof, for example, by means of rubber rollers.

Changes may be made within the scope and spirit of the appended claims.

We claim:

1. In a tape recorder having a tape forming a sound carrier and means for moving said tape and having a capstan drum for guiding said tape through an arcuate path and a rotatably mounted shaft carrying said capstan drum, said capstan drum comprising two generally cup-like coacting elements axially spaced on said shaft, one of said elements being rotatable with said shaft and the other element being rotatable thereon, each element having an axially inwardly extending annular flange defining on its outside a track for said tape, the inner edges of said flanges being axially spaced apart to define an annular gap, a bracket forming a holder extending from the outside radially into said gap, said shaft extending through said holder, and a plurality of magnetic heads carried by said holder inside said capstan drum, said heads being spaced on said holder for coaction each with a different area of said tape along the inner concave side thereof which faces said capstan drum.

2. The structure and cooperation of parts as specified in claim 1, wherein said magnetic heads are carried by said holder at different angular areas thereof for serially successive coaction with said tape.

3. The structure and cooperation of parts as specified in claim 1, wherein said heads are disposed on said holder transversally thereof for multiple lane coaction with said tape.

4. The structure and cooperation of parts as specified in claim 1, comprising guide rollers for engagement with the convex side of said tape to secure said tape in driving engagement with said drum, and additional resilient roller means also engaging said tape at the convex side thereof for respectively pressing said tape radially inwardly each against a correspondingly positioned magnetic head.

5. The structure and cooperation of parts as specified in claim 1, wherein said magnetic heads are generally ring-shaped coaxially disposed heads which embrace said shaft.

6. The structure and cooperation of parts as specified in claim 1, comprising means for fixedly securing said holder outside said capstan drum.

7. The structure and cooperation of parts as specified in claim 1, comprising means for rotatably journalling said shaft in said holder, and means for fixedly securing said holder outside said capstan drum.

8. The structure and cooperation of parts as specified in claim 1, comprising a relatively stationary structural member for rotatably securing said shaft, and means for fixedly securing said holder on said structural member outside said capstan drum.

References Cited in the file of this patent

UNITED STATES PATENTS 2,605,364 Masterson ------------- July 29, 1952

FOREIGN PATENTS 69,273 Norway --------------- May 28, 1945